United States Patent
Cloutier

(10) Patent No.: US 6,459,913 B2
(45) Date of Patent: Oct. 1, 2002

(54) UNIFIED ALERTING DEVICE AND METHOD FOR ALERTING A SUBSCRIBER IN A COMMUNICATION NETWORK BASED UPON THE RESULT OF LOGICAL FUNCTIONS

(75) Inventor: Jocelyn Cloutier, Menlo Park, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/303,517

(22) Filed: May 3, 1999

(51) Int. Cl.$^7$ .............................. H04M 1/00; H04M 3/42
(52) U.S. Cl. .................. 455/567; 455/417; 379/211.01
(58) Field of Search ................................ 455/567, 417, 455/414; 379/211, 212, 210, 213, 207, 211.01, 211.02, 212.01

(56) References Cited

U.S. PATENT DOCUMENTS

| | | | |
|---|---|---|---|
| 4,757,529 A | * 7/1988 | Glapa et al. ................. 379/244 |
| 5,329,578 A | * 7/1994 | Brennan et al. ............. 455/445 |
| 5,724,408 A | * 3/1998 | Morganstein ............... 379/88.2 |
| 5,742,905 A | * 4/1998 | Pepe et al. .................... 455/445 |
| 5,930,700 A | * 7/1999 | Pepper et al. ................ 455/414 |
| 5,930,702 A | * 7/1999 | Goldman et al. ............ 455/417 |
| 5,933,778 A | * 8/1999 | Buhrmann et al. .......... 455/445 |
| 5,943,607 A | * 8/1999 | Singer ......................... 455/31.3 |
| 6,038,442 A | * 3/2000 | Ueda et al. .................. 455/417 |
| 6,067,443 A | * 5/2000 | Fuller et al. ................. 455/31.2 |
| 6,295,447 B1 | * 9/2001 | Reichelt et al. ............. 455/417 |
| 2001/0055963 A1 | * 12/2001 | Cloutier ...................... 455/417 |

FOREIGN PATENT DOCUMENTS

EP   1 051 019   * 11/2000   .......... H04M/11/02

* cited by examiner

Primary Examiner—William Trost
Assistant Examiner—Rafael Perez-Gutierrez
(74) Attorney, Agent, or Firm—Oliff & Berridge, PLC

(57) ABSTRACT

This invention provides for a unified alerting system that alerts the subscriber via one or more devices. The unified alerting system receives alert events from services subscribed to by the subscriber, filters the alert events and alerts the subscriber via one or more devices identified in a subscriber profile. The alert event is filtered by if-then-else statements that contain conditions and actions. Conditions have Boolean values and the actions set various control variables or may be further if-then-else statements. In this way, the subscriber may specify complex conditions that process each alert event to determine whether the subscriber should be alerted via one of the available devices. The subscriber profile specifies possible devices through which the subscriber may be alerted via a schedule corresponding to each of the devices. The profile also includes a priority level for each of the devices when multiple devices are available. The unified alerting device may also perform various conversions such as voice-to-text and text-to-voice so that messages may be sent in an alert regardless of the capabilities of the devices used.

26 Claims, 9 Drawing Sheets

FIG. 4

| | | |
|---|---|---|
| 220 | A | TRUE IF TITLE OF E-MAIL INCLUDES "PROJECT X" ; FALSE OTHERWISE |
| 222 | B | TRUE IF TITLE OF E-MAIL INCLUDES "PROJECT Y" ; FALSE OTHERWISE |
| 224 | C | TRUE IF E-MAIL IS FROM "SALLY" ; FALSE OTHERWISE |
| 226 | D | TRUE IF E-MAIL IS FROM "JOCELYN" ; FALSE OTHERWISE |
| 228 | E | TIME OF DAY |
| | | . . . |

| 232 | 234 |
|---|---|
| 1 | E < ( 9:00 AM ; 1/26/99 ) |
| 2 | [( 9:00 AM ; 1/26/99 ) << E << ( 11:30 AM ; 1/26/99 )] AND [A AND D] |
| 3 | [( 1:30 PM ; 1/26/99 ) << E << ( 3:00 PM ; 1/26/99 )] AND [B AND C] |
| 4 | [( 11:30 AM ; 1/26/99 ) << E << ( 1:30 PM ; 1/26/99 )] |
| 5 | E > ( 3:00 PM ; 1/26/99 ) |
| ... | ... |

| | 504 | 506 | 508 | |
|---|---|---|---|---|
| 502 | CELL PHONE | TITLE | SENDER ID | ... |
| 510 — 1 | PDA | FULL MESSAGE | ... | ... |
| 512 — 1 | FAX | FULL MESSAGE | ... | ... |
| 514 — 2 | | | | |

500

UNIFIED ALERTING DEVICE AND METHOD FOR ALERTING A SUBSCRIBER IN A COMMUNICATION NETWORK BASED UPON THE RESULT OF LOGICAL FUNCTIONS

BACKGROUND OF THE INVENTION

1. Field of Invention

This invention relates to a method and apparatus for unified alerting of subscribers.

2. Description of Related Art

In this age of telecommunication explosion, a person may subscribe to a large number of different services such as paging service, cellphone service, e-mail service and many others delivered over the telephone network or the Internet, for example. A subscriber to multiple services may receive messages in any one of the services during a period of time even when that particular service is not accessible to the subscriber. Thus, the subscriber may be unaware of messages and miss opportunities to take timely action. Accordingly, new technology is needed to improve techniques for alerting subscribers.

SUMMARY OF THE INVENTION

This invention provides for a unified alerting system that alerts the subscriber via one or more subscriber identified devices. The unified alerting system includes a unified alerting device that receives alert events from services subscribed to by the subscriber such as e-mail, paging service, wireless mobile service (e.g., cellphone), Internet services, etc. The unified alerting device filters the alert event and, based on the filtering results, may generate an alert to one or more devices identified in a subscriber profile.

The alert event is filtered by a set of logic specified by the subscriber in terms of if-then-else statements containing conditions and actions, for example. Conditions have Boolean values of TRUE and FALSE based on values of variables as specified by the subscriber. For example, one variable may be the time of day while other variables may have Boolean values that are defined by the subscriber. For example, a Boolean variable A is TRUE if a title of an e-mail includes "project X"; otherwise, the Boolean variable A has a value of FALSE.

The actions included in the subscriber logic may set various control variables such as urgency level or priority or may be further if-then-else statements. In this way, the subscriber may specify complex conditions that process each alert event to determine whether the subscriber should be alerted via one of the available devices.

The subscriber profile includes entries corresponding to each of possible devices through which the subscriber may be alerted. A schedule may be entered by the subscriber that indicates times when each of the devices may be used to alert the subscriber. The profile also may include a priority level corresponding to each of the devices during time periods when multiple devices are available. Thus, the subscriber may specify during any time period which of the available devices is/are preferred for the alerting function.

The unified alerting device may also perform various conversions such as voice-to-text and text-to-voice or information extracted for their summaries so that messages received via text may be converted to voice and voice communication may be converted to text and the subscriber may converse with another party regardless of the capabilities of the device used.

BRIEF DESCRIPTION OF THE DRAWINGS

The invention is described in detail with reference to the following figures, wherein like numerals reference like elements, and wherein:

FIG. 4 shows a table of variables;

FIG. 5 shows a table of conditions;

FIG. 7 shows an exemplary alert command;

DETAILED DESCRIPTION OF PREFERRED EMBODIMENTS

Figure 1:
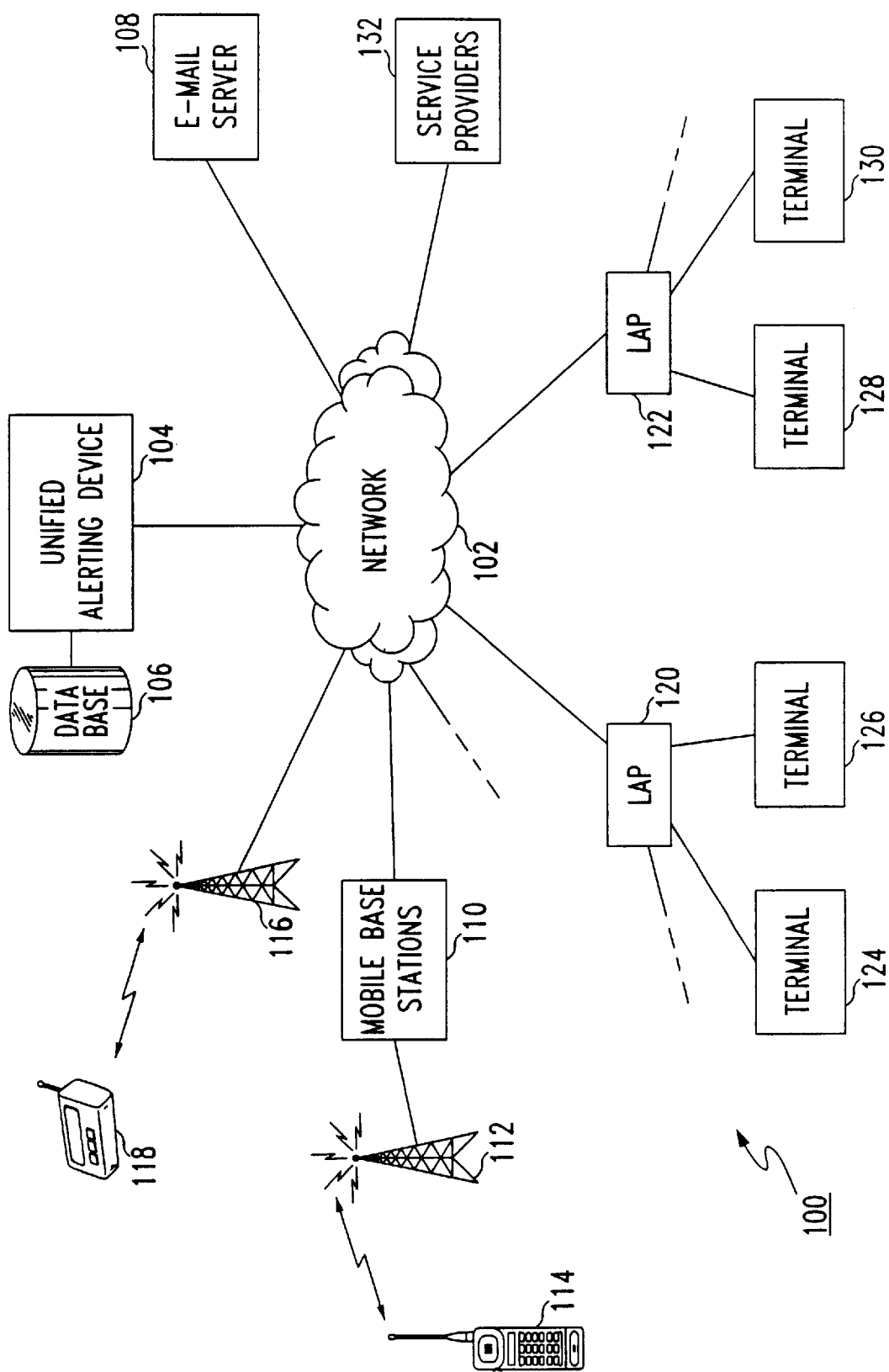
FIG. 1 shows an exemplary diagram of a unified alerting system.

FIG. 1 shows an exemplary block diagram of a unified alerting system 100. The unified alerting system 100 includes a network 102 coupled to: an e-mail server 108, service providers 132, cellphones such as cellphone 114 via mobile base stations 110 and towers 112, pagers such as pager 118 via paging towers 116, terminals 124–130 (e.g., telephone stations, personal computers, etc.) via local access providers (LAP) 120 and 122, and a unified alerting device 104.

The network 102 may include a telephone network (e.g., local and/or long distance), a data network such as the Internet, or other wired or wireless networks either private or public. The LAPs 120 and 122 may be local exchange carriers or other network interfaces such as Internet Service Providers.

A subscriber to the unified alerting system 100 may have subscribed to many other services. For example, the subscriber may have subscribed to a cellphone service, a pager service, an Internet service that receives e-mails from the e-mail server 108, and other types of services such as a system calendar with automated reminders and airline services that provide for flight change notification.

When the subscriber is on a trip without access to e-mail, for example, and e-mail is received for the subscriber, the e-mail server 108 may send an alert event to the unified alerting device 104 to indicate that an e-mail has been received for the subscriber. The alert event may be a message that identifies the sender and may include a summary of a received communication. For example, for e-mail, the alert event may include a title and a sender ID of the e-mail. For voice communication such as a telephone call, the alert event may provide caller ID information such as available from Automatic Name Identification (ANI).

When the alert event is received, the unified alerting device 104 filters the alert event based on conditions prespecified by the subscriber. If the alert event survives the filtering process, the unified alerting device 104 retrieves a subscriber profile from a database 106 and searches for a most likely device that may be used to alert the subscriber of the incoming e-mail. For example, if the subscriber profile indicates that the subscriber may be reached via the pager 118, the unified alerting device 104 then sends an alert (a page) via the paging towers 116 to alert the subscriber via the pager 118 of the incoming e-mail.

Similar to the above, if the subscriber receives a facsimile transmission at the terminal 124 (e.g., a subscriber's facsimile machine), either the terminal 124 or the LAP 120 may send an alert event to the unified alerting device 104 to indicate that the facsimile transmission has been received. After the filtering process, the unified alerting device 104 may locate an alternate facsimile device that is accessible to the subscriber and transfer the facsimile to the alternate facsimile device. If a facsimile device is not available, the unified alerting device 104 may send an alert to the subscriber via the cellphone 114 using synthesized voice, for example, to indicate that a facsimile has been received. The subscriber may retrieve the facsimile directly or instruct the unified alerting device 104 to forward the facsimile to a facsimile device accessible to the subscriber by contacting the unified alerting device 104 directly or by modifying the subscriber profile.

If the subscriber receives a voice phone call at the terminal 126 (the subscriber's telephone station) and the subscriber had specified that communications to the terminal 126 should be re-routed, then the LAP 120 may send an alert event to inform the unified alerting device 104 of the call. The unified alerting device 104 filters the alert event and, if required, determines via the subscriber profile whether the subscriber may receive the voice phone call via the cellphone 114 (or other voice terminals or devices), for example. If the subscriber may be reached via the cellphone 114, the unified alerting device 104 routes the call to the cellphone 114 via the mobile base station 110 and the tower 112. If the subscriber had specified that a logging device (not shown) be alerted, for example, then the unified alerting device 104 sends the alert to the logging device which in turn logs the communication. The LAP 120 may also generate an alert event when the communication ends (i.e., if the communication was re-routed and responded to) and this alert event may be directed to the logging device to log when the communication ended. The unified alerting device 104 may generate the alert to the logging device so that a record of the communication and its duration may be saved, for example. Thus, the unified alerting device 104 locates and alerts the subscriber or a subscriber device or service when communication for the subscriber is received by any one of the services subscribed to by the subscriber.

While the above description provides for specific examples of services that generate alert events, other sources of alert events may also be possible. For example, the subscriber may subscribe to a calendar service that generates alert events based on prespecified circumstances. The alert event may be a message that contains an appointment time and names of parties of the appointment. The subscriber may have made flight reservations with an airline that offers flight schedule change alerts. Thus, if a flight schedule has changed, an alert may be generated that indicates a new departure time, for example. The subscriber may also instruct the unified alerting device 104 to alert a party at the landing location to indicate arrival time changes to inform the party when to pick up the subscriber, for example. Thus, there may be many sources for alert events and these events are processed by the unified alerting device 104 as described below.

Figure 2:
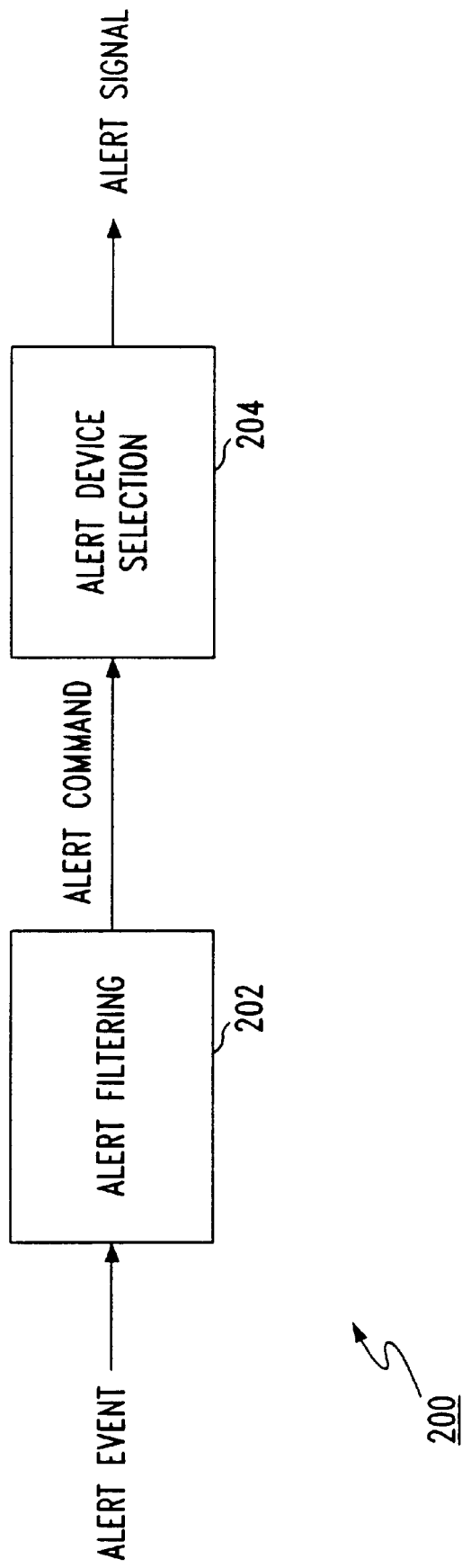
FIG. 2 shows an exemplary process for generating an alert signal.

The unified alerting device 104 filters the alert events received from various services subscribed to by the subscriber to determine an urgency level of the associated communication. As shown in FIG. 2, the unified alerting device 104 proceeds along a process 200 which first performs an alert filtering process 202 for each of the alert events received and those alert events that are selected by the filtering process 202 result in an alert command. An alert device selection process 204 receives the alert command and generates an alert signal to a device specified in a subscriber profile.

The alert filtering process 202 filters each alert event based on a set of conditions that is specified by the subscriber. For example, the subscriber may plan to take a business trip to attend two meetings regarding very important business transactions. However, due to unavoidable circumstances, critical information needed to complete the meetings is not available at the time the subscriber leaves for the meetings. Such information is being acquired by other members of the business team such as Jocelyn, the subscriber's boss, and Joe, the subscriber's coworker. Thus, in order to ensure that the information obtained by Jocelyn and Joe may be obtained as soon as the information is available, the subscriber may specify the conditions so that the subscriber is alerted as soon as messages from Jocelyn and Joe are received. At the same time, the subscriber may desire to filter out all other messages so that only alerts corresponding to messages from Jocelyn or Joe are permitted to alert the subscriber during a specified period of time.

Figure 3:
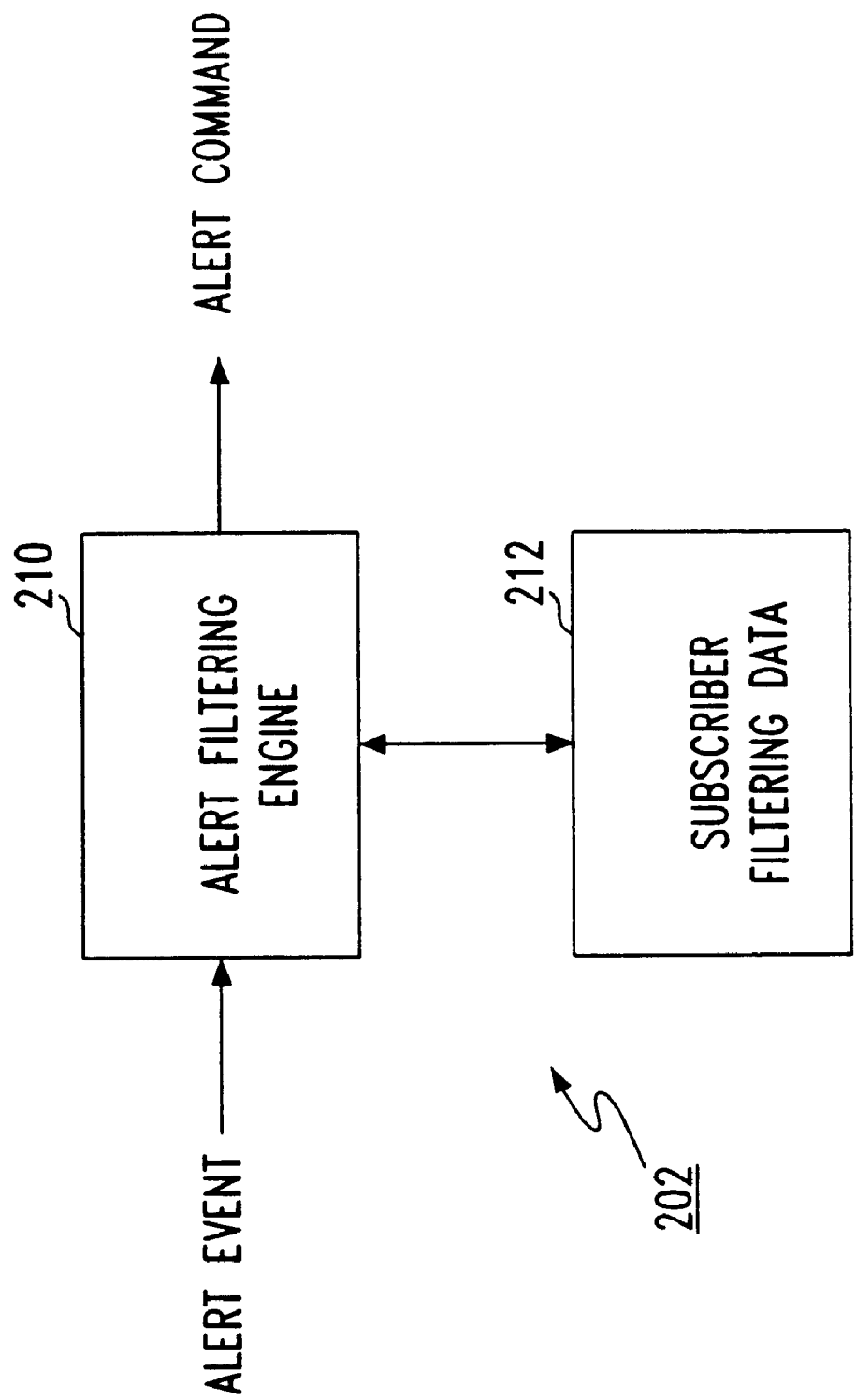
FIG. 3 shows an exemplary block diagram for an alert filtering device shown in FIG. 2.

FIG. 3 shows an exemplary block diagram of a device that performs the alert filtering process 202. An alert filtering engine 210 receives alert events from the network 102 and generates alert commands based on subscriber filtering data 212. The alert filtering engine 210 may execute a program that essentially performs logical functions in the form of if-then-else statements such as if <condition> then <action list 1> else <action list 2>. An action list is a set of one or more actions. For the remainder of the discussion, only one action in the action list 1 (action 1) and one action in the action list 2 (action 2) are used for ease of discussion. The condition may be a regular expression which has a Boolean value of "TRUE" or "FALSE". For example, the condition may be A AND B where A has a Boolean value of TRUE if the title of a received e-mail includes "project X"; otherwise, A has a value of FALSE. B has a value of TRUE if the title of the e-mail includes "project Y"; otherwise, B has a value of FALSE. Thus, A AND B will have a value of TRUE if the e-mail message includes both project X and project Y.

Actions may be a specific action taken by the alert filtering engine 210 such as setting an urgency level value or generating an alert command. For example, action 1 may set the urgency level to 1 and action 2 may set the urgency level to 2, where the urgency level of 1 is of greater urgency than the urgency level of 2. Thus, the alert filtering engine 210 may filter incoming alert events based on logical values of Boolean variables combined using operators in regular expressions specified by the subscriber. The operators may include any mathematical operators (e.g., algebraic/set operators such as $>, <, =, -, \div, \times, \subset, \subseteq, \supset, \supseteq, \not\subset, \cup, \cap, \in, \notin, \forall, \exists, \ni$, etc., and Boolean operators such as AND, OR, NOT, XOR, etc.).

The action performed by the alert filtering engine 210 may either be a direct action, such as setting an urgency level, or another if-then-else statement. Thus, the subscriber may specify complex conditions so that a sophisticated filtering process may be achieved. While the above embodiment of the filtering process uses the if-then-else construct, other techniques of filtering are also possible. For example, any program that selects certain alert events over other alert events based on specified circumstances may be applied.

The subscriber filtering data 212 may include variable definitions as well as expressions as shown in FIGS. 4 and 5. In FIG. 4, a table 214 of variables A–E are shown as an example. The table 214 has a variable column 216 and a definition column 218. Entries 220–228 define the meaning of each of the corresponding variables A–E. For example, entries 220 and 222 specify the definition of Boolean variables A and B as discussed earlier. Entries 224 and 226 specify the definition of Boolean variables C and D. The Boolean variable C has the value of TRUE if the e-mail is from Sally and FALSE otherwise. Sally may be a rendezvous between Joe and the subscriber, for example. The Boolean variable D has the value of TRUE is the e-mail is from "Jocelyn" and FALSE otherwise. In entry 228, the variable E is not a Boolean variable but an algebraic variable that is set to the time of day. These variables are set to their respective values by the alert filtering engine 210 based upon the specifications as set forth in the description field 218 of the table 214. The alert filtering engine 210 may also interact with the source of the alert event such as the e-mail server 108 to obtain the information required to set the variable values.

FIG. 5 shows a table 230 of regular expressions. The table 230 has a regular expression identification field 232 and a regular expression field 234. The entries 236–244 of the table 230 define all of the conditions as specified by the subscriber. For example, entry 236 specifies condition 1 being TRUE when the time of day E is less than 9:00 am on Jan. 26, 1999. Thus, if the time of day is after 9:00 am, condition 1 is FALSE. Similarly, condition 2 is TRUE when the time of day is between 9:00 am and 11:30 am on Jan. 26, 1999 and if Boolean variable A and D are TRUE. Thus, condition 2 is TRUE if an alert event is an e-mail received from Jocelyn having the title "project X" and the alert event is received between 9:00 am and 11:30 am on Jan. 26, 1999. Conditions 3–5 are similarly defined.

Based on the subscriber filtering data as described in FIGS. 4 and 5 above, the subscriber may specify the alert filtering as follows:

```
if condition 1 then urgency level = 5
else if condition 2 then urgency level = 1
      else if condition 3 then urgency level = 1
            else if condition 4 then urgency = 2
                  else if condition 5 then urgency level = 5
                        end if;
                  end if;
            end if;
      end if;
end if;
.
.
.
if condition 1 AND urgency level >3 then generate alert command end if;
if (condition 2 OR condition 4) AND urgency level >2 then generate alert
command
end if;
if condition 3 AND urgency level >4 then generate alert command end if;
if condition 5 AND urgency level >8 then generate alert command end if;
.
.
.
```

The above program example first sets urgency levels based on the conditions 1–5 and then specifies the conditions under which alert commands are generated. Other types of programs and variables and/or condition specifications are also possible including other program type statements such as assign, case, etc. Thus, the alert filtering engine 210 executes filtering instructions based upon the subscriber filtering data 212 to determine when an alert command may be generated.

Figure 6:
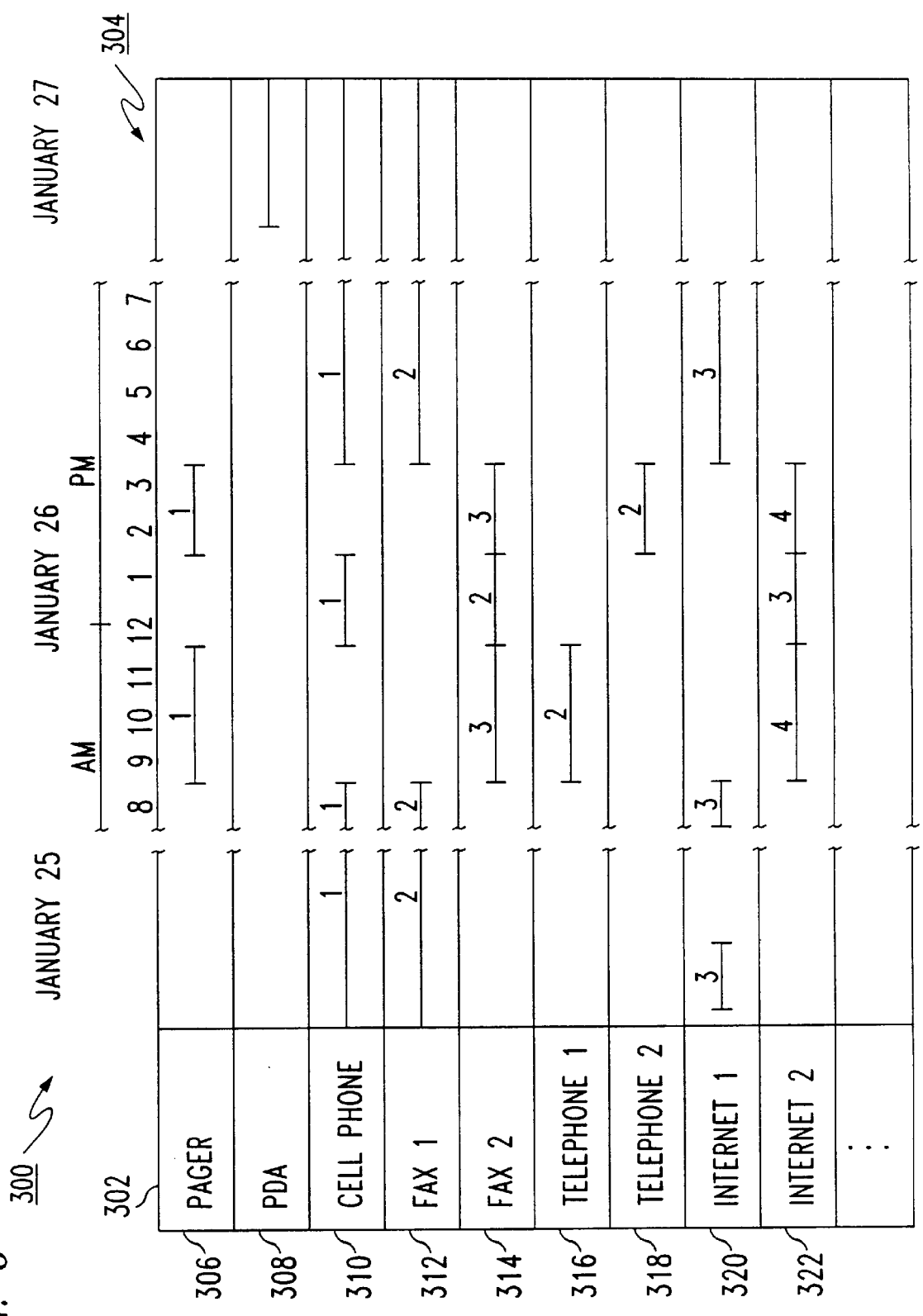
FIG. 6 shows a user device profile.

The alert device selection process 204 determines which of the services specified by the subscriber in a subscriber profile 300 may be used to alert the subscriber. FIG. 6 shows the subscriber profile 300 which includes a device field 302 and an availability field 304. The device field 302 identifies all the devices that may be used to alert the subscriber and the availability field 304 indicates the time when each of the devices identified in the device field 302 may be used to alert the subscriber and the priority in which the device should be used when more than one device are available. The subscriber profile 300 may be initially generated by the unified alerting device 104 based on records of the services subscribed to by the subscriber. As the need arises, the subscriber may modify the subscriber profile 300 by adding other devices that may be accessible (e.g., a facsimile machine near a meeting room) and the time periods that each of the devices may be used.

For example, between 8:30 am and 11:30 am on January 26, the subscriber may be reached via a pager as indicated in entry 306, a facsimile machine as indicated in entry 314, a telephone station (telephone 1) as indicated in entry 316 and an Internet log-on ID as indicated in entry 322. As indicated by the numbers above each schedule line, the subscriber has specified a priority order for each of the available devices as: the pager first, then telephone 1 second, then fax 2 third, and then Internet 2 fourth. For example, if the incoming communication is text, the alert device selection process 204 may select the pager of entry 306 and display the title of the text. However, if the pager does not acknowledge receipt (either transmission via a two-way pager signal or via a revertive call), then the alert device selection process 204 may send an alert via telephone 1 of entry 316 by converting the title of the text into voice and outputting speech via speech synthesis to the telephone 1 when answered.

If telephone 1 does not answer, the alert device selection process 204 may then convert the text into a facsimile transmission and transmit the converted text to fax 2 of the entry 314. If fax 2 cannot be reached (i.e., no answer or busy, for example), then the alert device selection process 204 may send the text to the Internet ID at Internet 2 of entry 322. Thus, the priority assigned by the subscriber indicates an order in which the alert device selection process 204 attempts to communicate the received communication. If two of the available devices have the same priority, or no priority is specified, then the alert device selection process 204 may attempt to alert the subscriber via all the available devices at the same priority concurrently. Alternatively, the unified alerting device 104 may use a round robin technique for selecting an alert device, for example. In this way, the alert device selection process 204 may achieve a best effort to reach the subscriber.

The subscriber profile 300 may include other parameters set by the subscriber to elect other features such as to specify a number of times to retry before going on to lower priority devices, to delay the alert by a predetermined amount of time, to delay the alert until after a predetermined time period (e.g., if the subscriber will not be accessible or does not want to be accessible between 9:00 am and 10:00 am), to convert between communication types (e.g., between text, voice or video), or to extract or summarize the received communication for the alert or to be sent with the alert. If an incoming communication is transmitted in one type such as text (e.g., ASCII), and the device selected is an audio type device such as a telephone, for example, then the subscriber may elect to convert the text to voice to alert the subscriber via an audio signal such as a telephone call. Thus, the subscriber has the option of directing the alert device selection process 204 to select an available device having a higher priority or to select the best available device with the highest priority that is capable of receiving the incoming communication without conversion (i.e., the selected device is capable of receiving communication of the same type as the incoming communication).

For example, if a facsimile is received at 9:00 am on January 26, the unified alerting device 104 may send the facsimile to fax 2 (entry 314) immediately, unless otherwise specified. The subscriber may also specify to always alert via the pager 118, for example. In this case, the unified alerting device 104 also sends an alert via the pager 118 with a message such as "facsimile waiting at fax 2", for example. The subscriber profile may be overridden by the subscriber explicitly specifying how various communications should be handled via the alert filtering process 202 so that the alert device selection process 204 may be directed to search for one or more devices based on the schedule portion of the subscription profile 300.

For example, if a facsimile message is received and the subscriber's profile indicates that the cellphone 114 is a first priority device and a facsimile machine is a second priority device, the unified alerting device 104 may select the facsimile device over the cellphone 114 because the incoming message is a facsimile message. However, the subscriber may have specified via the subscriber filtering data 212 that for this particular alert event (identified by title, sender name, etc.), the alert is to be transmitted via the cellphone 114 with text of title and sender ID speech synthesized and the full text is to be transmitted to the PDA (entry 308 in FIG. 6, for example) at the same time. If the above alert cannot be completed, then send the full text via a facsimile.

The subscriber may also specify, via the alert filtering process 202, to extract particular information to use for the alert. For example, the title and sender ID of an e-mail may be extracted for a pager alert. More advanced extraction techniques such as automatic summary or identification of keywords may also be performed.

FIG. 7 shows an alert command 500 for the above filtering result. A field 502 indicates priority and fields 504–508 indicate the device type and message content of the alert. Thus, the alert command indicates alerting via the cellphone 114 with title and sender ID and sending the full text to a PDA as a first priority. The full message is sent to a facsimile machine as a second priority only if the first priority devices do not respond.

While the above describes a particular embodiment for the alert device selection process 204, other techniques may also be used. For example, the device selection may be completely imbedded into the conditions as processed by the alert filtering engine 210. Thus, the alert command may include specific parameters that directs the alert device selection process 204 to select a particular device and to perform any conversions such as text-to-voice or voice-to-text that may be necessary. In this way, the subscriber may have broad flexibility to control which communications are received, which device(s) to receive the communication and how the communication is received.

Figure 8:
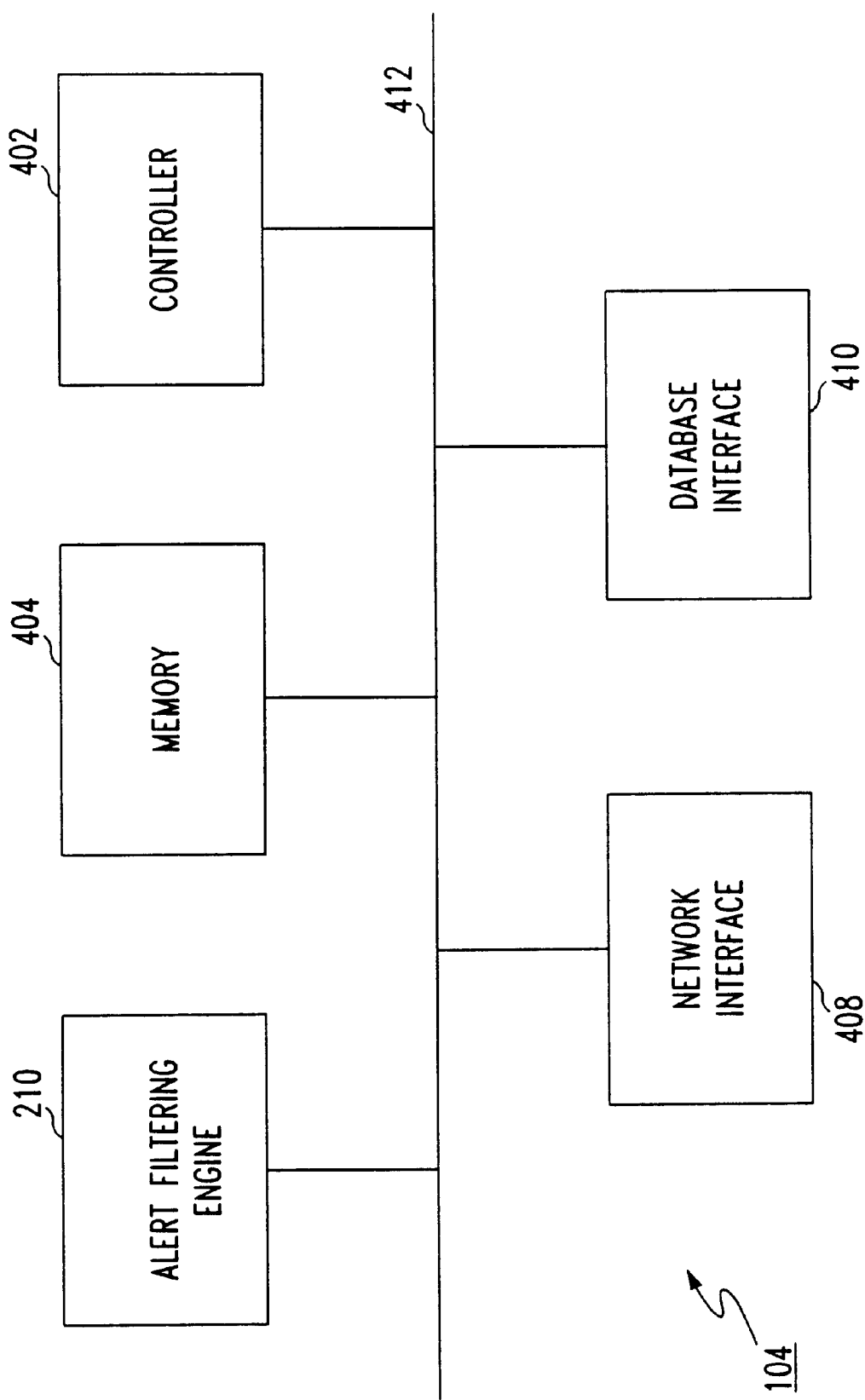
FIG. 8 shows an exemplary block diagram for a unified alerting device.

FIG. 8 shows an exemplary block diagram of the unified alerting device 104. The unified alerting device 104 includes a controller 402, a memory 404, the alert filtering engine 210, a network interface 408, and a database interface 410. The above components may be coupled together via a signal bus 412. While FIG. 8 shows a bus architecture, other hardware configurations may also be possible as is well known in the art. In addition, while FIG. 8 shows the controller 402 and the alert filtering engine 210 as separate units, the functions performed by these units may be combined or may be further divided among specific processors such as digital signal processors and/or performed by dedicated hardware such as application specific integrated circuits (ASIC) or other hardware implementations such as PLD, PAL or PLAs, for example.

When an alert event is received via the network interface 408, the controller 402 may retrieve the subscriber filtering data 212 via the database interface 410, place the subscriber filtering data 212 in the memory 404 and instruct the alert filtering engine 210 to determine whether an alert command should be generated based on the subscriber filtering data 212. The alert filtering engine 210 executes the logic specified by the subscriber conditions, etc. and issues an alert command to the controller 402 based on the subscriber logic. If an alert command is received, the controller 402 retrieves the subscriber profile from the database 106 via the database interface 410 and performs the alert device selection process 204 to determine which of the devices is available to reach the subscriber and what conversions might be necessary to be performed so that the communication may be placed in the correct format for the selected device.

For example, if a telephone call was received for the subscriber and the subscriber may only be reached via the Internet, the controller 402 may perform text-to-speech and speech-to-text conversions and connect the calling party with the subscriber's Internet logon so that the subscriber may communicate with the caller via an Internet access terminal. The reverse situation may also be achieved if the subscriber is available via a telephone while the other communicating party is using a text terminal such as a personal digital assistant (PDA). Thus, the controller 402 may alert the subscriber via an appropriate device and may serve as a critical communication link between the subscriber and the other communicating party.

Figure 9:
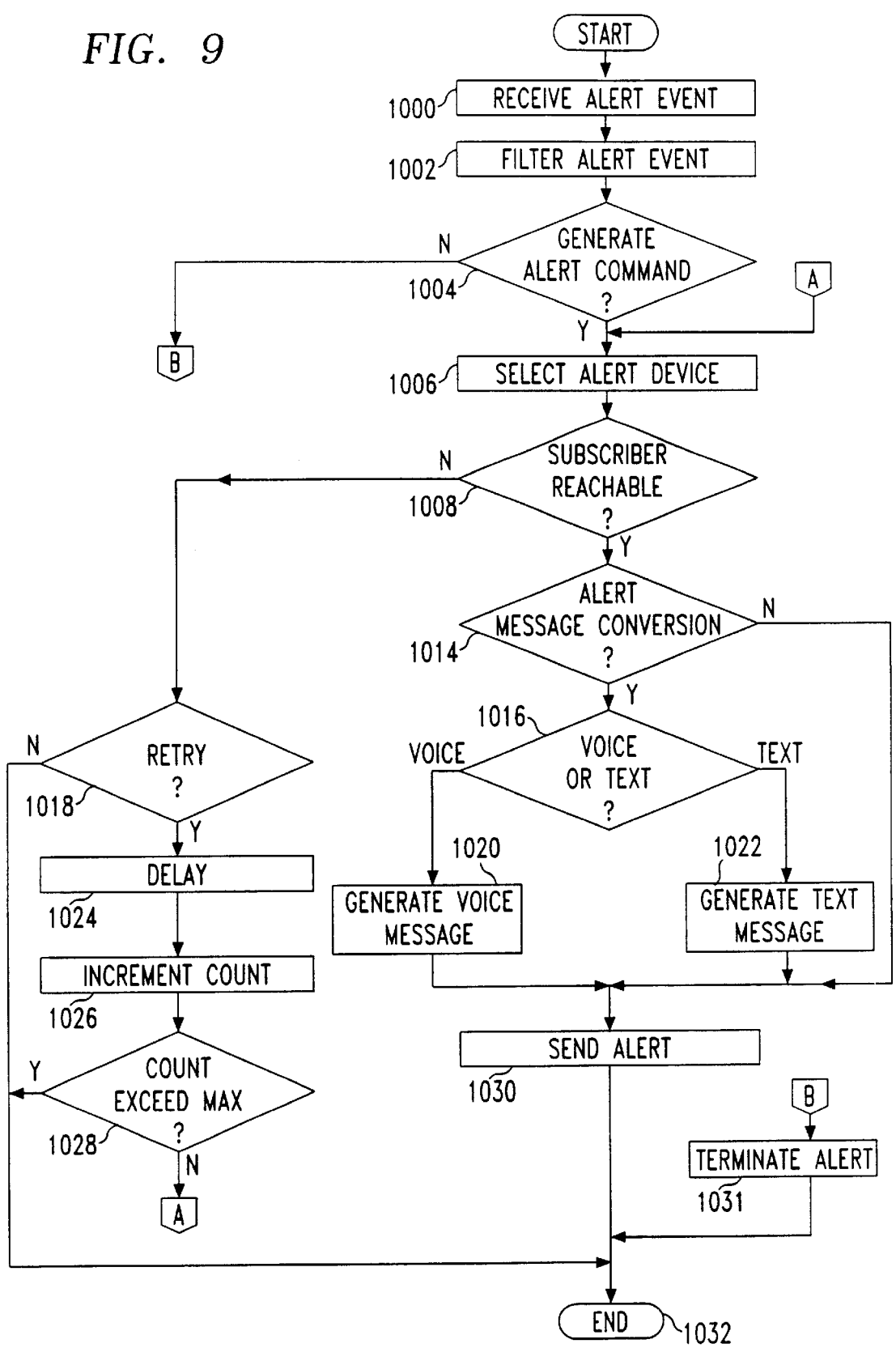
FIG. 9 shows a flow chart of an exemplary process of the unified alerting device.

FIG. 9 shows a flowchart for a process of the unified alerting device 104. In step 1000, the controller 402 receives an alert event through the network interface 408 and goes to step 1002. In step 1002, the controller 402 directs the alert filtering engine 210 to process the alert event and goes to step 1004. In step 1004, the controller 402 determines whether the alert filtering engine 210 has generated an alert command. If an alert command is generated, the controller 402 goes to step 1006; otherwise, the controller 402 goes to step 1031. In step 1031, the controller 402 terminates the alert process by either instructing the device that generated the corresponding alert event to place a message in the voice mailbox (for a phone call, for example) or take no further action (for e-mail service, for example) and goes to step 1032 to end the process.

In step 1006, the controller 402 selects the alert device based on the alert command and the subscriber profile 300 retrieved via the database interface 410 and goes to step 1008. In step 1008, the controller 402 determines whether the subscriber is reachable. The alert command may include multiple devices, each identified with a priority field. If such is the case, the controller 402 attempts to alert the subscriber via the highest priority devices and, if unsuccessful, then the next highest priority device(s) is used to generate the alert. The controller 402 determines that the subscriber is not reachable only when all of the identified device and alert command has been exhausted. If reachable, the controller goes to step 1014; otherwise, the controller goes to step 1018.

In step 1018, the controller 402 determines whether the subscriber has selected a retry option. If retry is selected, the controller 402 goes to step 1024; otherwise, the controller 402 goes to step 1032 and ends the process. In step 1024, the controller 402 delays for a predetermined amount of time and goes to step 1026. In step 1026, the controller 402 increments a count and goes to step 1028. In step 1028, the controller 402 determines whether the count has exceeded the maximum. If exceeded, the controller 402 goes to step 1032 to end the process; otherwise the controller 402 returns to step 1006 to select the alert device. A new alert device must be selected because time has passed and different devices may be available since the last selection.

In step 1014, the controller 402 determines whether alert message conversion is required. If required, the controller 402 goes to step 1016; otherwise, the controller 402 goes to step 1030. In step 1016, the controller 402 determines whether the alert device is a voice device or a text device. If a voice device, the controller 402 goes to step 1020; otherwise, the controller 402 goes to step 1022. In step 1020, the controller 402 generates a voice message (with conversion if necessary) and goes to step 1030. In step 1022, the controller 402 generates a text message (with conversion if necessary) and goes to step 1030. In step 1030, the controller 402 sends the alert to the selected alert device and goes to step 1032 to end the process.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A unified alerting device that alerts a subscriber in a communication network, comprising:
   a database including a subscriber profile;
   a network interface; and
   a controller coupled to the database and the network interface, the controller receiving an alert event from the network via the network interface, filtering the alert event based on subscriber filtering data by executing a program that performs logical functions entered by the subscriber, and alerting the subscriber via a device based on the subscriber profile retrieved from the database and a result of the filtering, wherein the logical functions include a combination of one or more conditions and one or more actions, and wherein the subscriber profile includes a schedule of availability for a plurality of devices that specifies a date and time for each of the devices that may be used to alert the subscriber and a priority specification indicates a priority of each of the devices that are available for a common period of time and are accessible by the subscriber.

2. The device of claim 1, wherein the controller selects a device from the subscriber profile that has a highest priority among those devices that may receive an information type that matches an information type of a communication corresponding to the alert event, and alerts the subscriber using the information type of the communication via the selected device.

3. The device of claim 2, wherein the information type includes text, voice, and video.

4. The device of claim 1, wherein the controller receives a portion of a communication corresponding to the alert event in one information type, and generates the alert for the device in another information type, where information types include text, voice, and video.

5. The device of claim 1, wherein the controller makes a decision whether to alert the subscriber, the decision being made by evaluating one or more if-then-else statements based on said one or more conditions and said one or more actions.

6. The device of claim 5, wherein an action includes setting a value of a variable or evaluating additional one or more conditions and taking additional one or more actions based on results of the evaluations of the additional one or more conditions.

7. The device of claim 5, wherein the controller evaluates one or more conditions to obtain Boolean values, where each of the conditions evaluate to a Boolean value, and takes one or more actions based on the Boolean values.

8. The device of claim 7, wherein a condition is a regular expression of one or more variables combined with operators, each of the variables having a quantity that may be evaluated.

9. The unified alerting device of claim 1, wherein the subscriber subscribes to multiple communication services and the unified alerting device receives an alert event from any of the subscribed services.

10. The device of claim 1, wherein the controller alerts the subscriber via a second device if the subscriber is busy at the first device.

11. The device of claim 1, wherein the alert include at least one of an audio signal, a text message, or a video message.

12. A method for alerting a subscriber in a communication network, comprising:
   providing a subscriber profile in a database;
   receiving an alert event from the network;
   filtering the alert by executing a program that performs logical functions entered by the subscriber representing subscriber filtering data, said logical functions including a combination of one or more conditions and one or more actions; and
   alerting the subscriber with an alert via a first device based on the subscriber profile retrieved from the database and a result of the filtering,
   wherein the subscriber profile includes a schedule of availability for a plurality of devices that specifies a date and time for each of the devices that may be used to alert the subscriber, and a priority specification indicates a priority of each of the devices that are available for a common period of time and are accessible by the subscriber.

13. The method of claim 1, further comprising:
   selecting a device from the subscriber profile that has a highest priority among those devices that may receive an information type that matches an information type of a communication corresponding to the alert event; and
   alerting the subscriber using the information type of the communication via the selected device.

14. The method of claim 13, wherein the information type includes text, voice, and video.

15. The method of claim 1, further comprising:
   receiving a portion of a communication corresponding to the alert event in one information type; and
   generating the alert for the device in another information type, where information types include text, voice, and video.

16. The method of claim 1, further comprising one of:

waiting for a predetermined amount of time before performing the alerting step; or not performing the alerting step during a pre-specified period of time.

17. The method of claim 1, wherein the filtering step makes a decision whether to alert the subscriber, the decision being made by evaluating one or more if-then-else statements based on the one or more conditions and the one or more actions.

18. The method of claim 17, further comprising:

evaluating one or more conditions to obtain Boolean values, where each of the conditions evaluate to a Boolean value; and taking one or more actions based on the Boolean values.

19. The method of claim 18, wherein a condition is a regular expression of one or more variables combined with operators, each of the variables having a quantity that may be evaluated.

20. The method of claim 17, wherein an action includes setting a value of a variable or evaluating additional one or more conditions and taking additional one or more actions based on results of the evaluations of the additional one or more conditions.

21. The method of claim 1, wherein the subscriber subscribes to multiple communications services and the alert event if received from any of the subscribed services.

22. The method of claim 1, further comprising alerting the subscriber via a second device if the subscriber is busy at the first device.

23. The method of claim 1, wherein the alert includes at least one of an audio signal, a text message, or a video message.

24. The method of claim 23, further comprising:

extracting information from a communication corresponding to the alert event; and one of:

including extracted information with the alert, or sending the extracted information as the alert.

25. A unified alerting device that alerts a subscriber in a communication network, comprising:

a database including a subscriber profile;

a network interface; and a controller coupled to the database and the network via the network interface, the controller receiving an alert event from the network interface, filtering the alert event based on subscriber filtering data by executing a program that performs logical functions entered by the subscriber, and alerting the subscriber via a device based on the subscriber profile retrieved from the database and a result of the filtering, wherein the alert event is generated based on an incoming communication to the communication network and wherein the logical functions include a combination of one or more conditions and one or more actions.

26. A method for alerting a subscriber in a communication network, comprising:

providing a subscriber profile in a database;

receiving an alert event from the network, the alert event generated based on an incoming communication to the communication network;

filtering the alert event by executing a program that performs logical functions entered by the subscriber representing filtering data, said logical functions including a combination of one or more conditions and one or more actions; and alerting the subscriber with an alert via a device based on the subscriber profile retrieved from the database and a result of the filtering.

* * * * *